United States Patent
Cohoon

[11] Patent Number: 5,845,370
[45] Date of Patent: Dec. 8, 1998

[54] SELF-POSITIONING TIE DOWN STRAP

[76] Inventor: Gilbert Cohoon, 2914 Roger St., Sebrine, Fla. 33872

[21] Appl. No.: 877,157

[22] Filed: Jun. 17, 1997

[51] Int. Cl.[6] ..................................................... A44B 11/00
[52] U.S. Cl. ............................ 24/68 CD; 24/170; 24/200
[58] Field of Search ................................ 24/68 CD, 170, 24/190, 200; 292/288; 410/100, 110, 21

[56] References Cited

U.S. PATENT DOCUMENTS

| | | | |
|---|---|---|---|
| 2,679,670 | 6/1954 | Griswold | 24/68 CD |
| 3,927,912 | 12/1975 | Takada | 24/170 |
| 3,971,589 | 7/1976 | Eliod | 296/76 |
| 4,188,061 | 2/1980 | Shehi | 296/76 |
| 4,666,194 | 5/1987 | Charmeen | 292/288 |
| 5,063,641 | 11/1991 | Chuan | 24/68 CD |
| 5,320,398 | 6/1994 | Popp et al. | 296/76 |
| 5,398,385 | 3/1995 | Plut | 24/68 CD |

*Primary Examiner*—Victor N. Sakran
*Attorney, Agent, or Firm*—Joseph N. Breaux

[57] ABSTRACT

A self-tensioning tie down strap that includes first and second attachment clips, a buckle assembly, and a self-tensioning strap assembly wherein the buckle assembly is connected to the self-tensioning strap assembly; the buckle assembly and the self-tensioning strap assembly are connected between the first and second attachment clips; and the self-tensioning strap assembly includes a spring loaded take up spool mechanism, a length of take up spool strapping material, a variable length strap section, and a fixed length strap section; the length of take up reel strapping material being wound onto the take up spool of the take up spool mechanism; a free end of the take up reel strapping material being attached to a first end of the variable length strap section; the second end of the variable length strap section being secured to a frame portion of the take up spool mechanism; a third end of the fixed length strap section being secured to the frame portion of the take up spool mechanism; and the take up reel strapping material having a first thickness less than a second thickness of the variable length strap section.

4 Claims, 3 Drawing Sheets

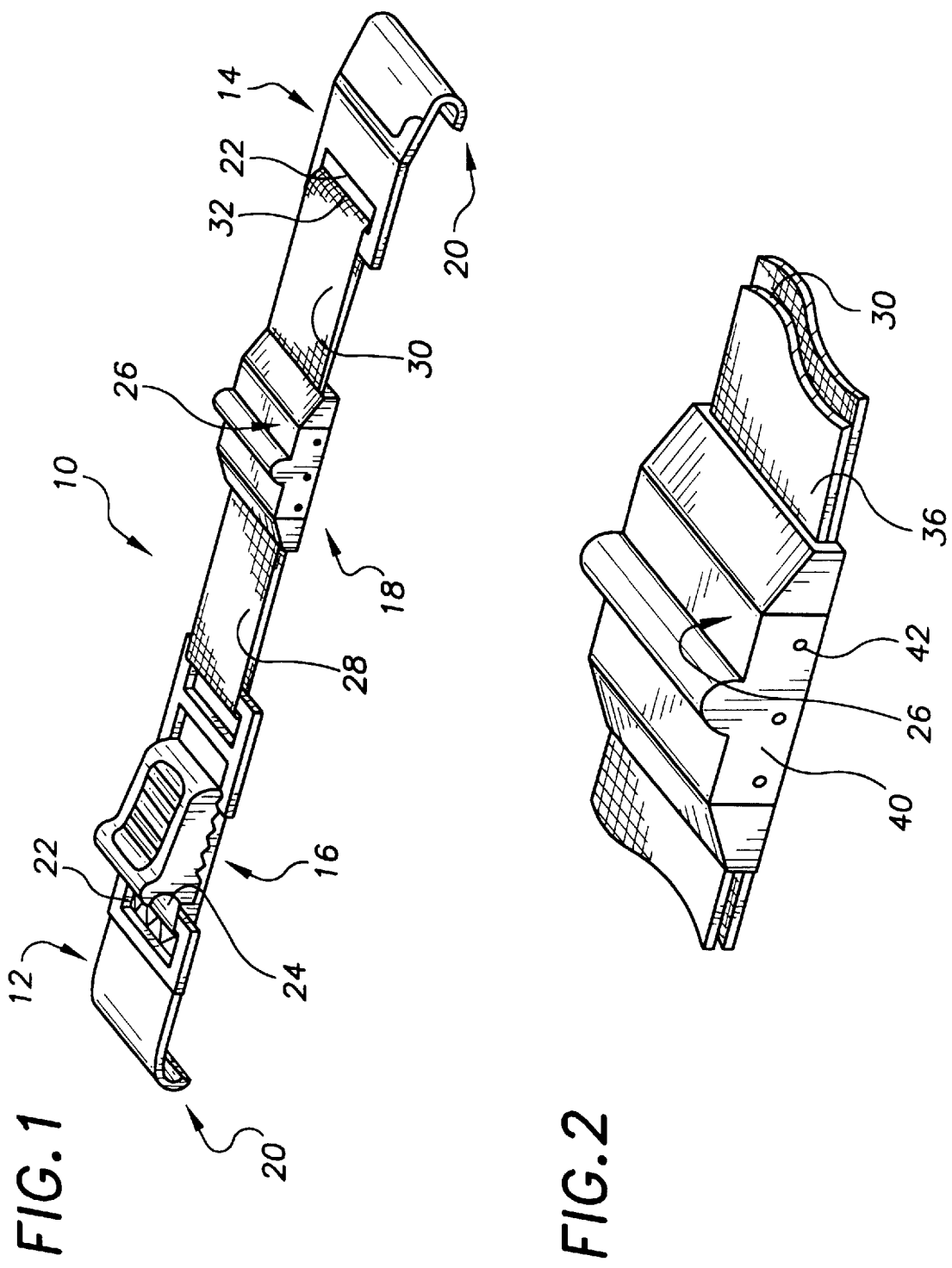

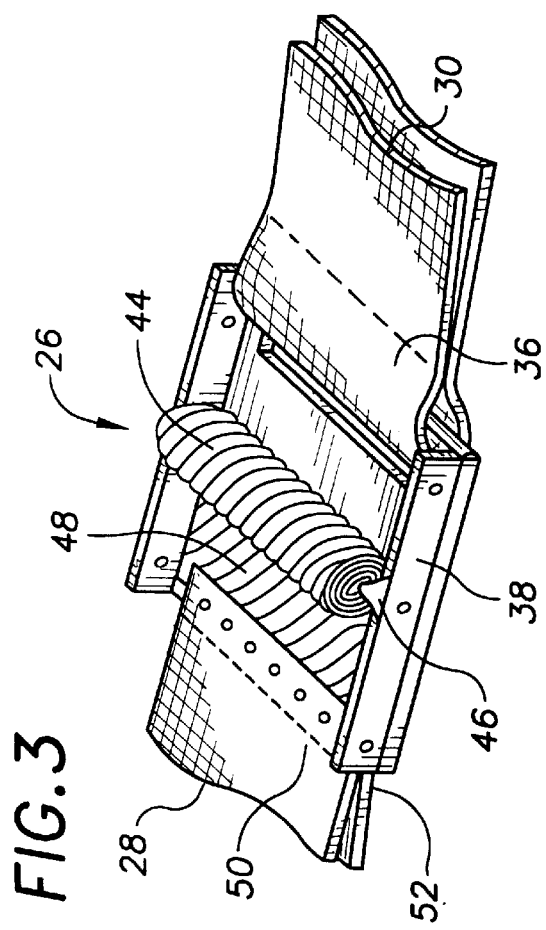
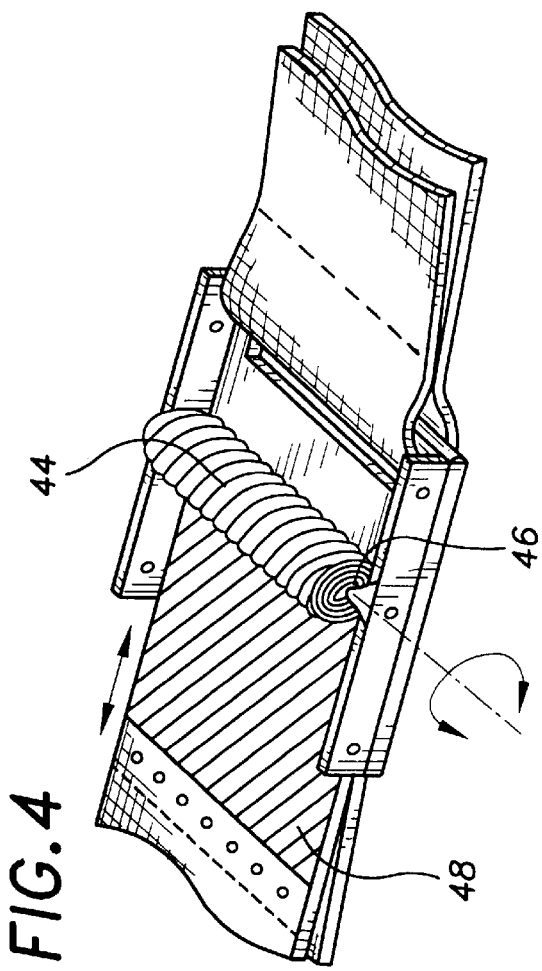

SELF-POSITIONING TIE DOWN STRAP

TECHNICAL FIELD

The present invention relates to tie down straps and more particularly to a self-tensioning tie down strap that includes first and second attachment clips, a buckle assembly, and a self-tensioning strap assembly wherein the buckle assembly is connected to the self-tensioning strap assembly; the buckle assembly and the self-tensioning strap assembly are connected between the first and second attachment clips; and the self-tensioning strap assembly includes a spring loaded take up spool mechanism, a length of take up spool strapping material, a variable length strap section, and a fixed length strap section; the length of take up reel strapping material being wound onto the take up spool of the take up spool mechanism; a free end of the take up reel strapping material being attached to a first end of the variable length strap section; the second end of the variable length strap section being secured to a frame portion of the take up spool mechanism; a third end of the fixed length strap section being secured to the frame portion of the take up spool mechanism; and the take up reel strapping material having a first thickness less than a second thickness of the variable length strap section.

BACKGROUND OF THE INVENTION

Providing a tight tie down for a trunk lid or the like can be difficult for individuals without knot tying experience. It would be a benefit to these and other individuals to have a tie down strap for tying down a trunk lid or the like that included a tensioning mechanism that automatically provides the proper tension between the trunk lid and the trunk latch. Because disconnecting the tie down strap after it is no longer needed can be difficult for some individuals, it would be a further benefit to have a two-part tie down strap that was interconnected by an easily disconnected buckle.

SUMMARY OF THE INVENTION

It is thus an object of the invention to provide a self-tensioning tie down strap that includes a tensioning mechanism between first and second attachment clips that automatically provides a predetermined tension between the first and second attachment clips.

It is a further object of the invention to provide a self-tensioning tie down strap that includes a two-part tie down strap with a tensioning mechanism wherein the two-part tie down strap is interconnected by an easily disconnected buckle.

It is a still further object of the invention to provide a self-tensioning tie down strap that includes first and second attachment clips, a buckle assembly, and a self-tensioning strap assembly wherein the buckle assembly is connected to the self-tensioning strap assembly; the buckle assembly and the self-tensioning strap assembly are connected between the first and second attachment clips; and the self-tensioning strap assembly includes a spring loaded take up spool mechanism, a length of take up spool strapping material, a variable length strap section, and a fixed length strap section; the length of take up reel strapping material being wound onto the take up spool of the take up spool mechanism; a free end of the take up reel strapping material being attached to a first end of the variable length strap section; the second end of the variable length strap section being secured to a frame portion of the take up spool mechanism; a third end of the fixed length strap section being secured to the frame portion of the take up spool mechanism; and the take up reel strapping material having a first thickness less than a second thickness of the variable length strap section.

It is a still further object of the invention to provide a self-tensioning tie down strap that accomplishes some or all of the above objects in combination.

Accordingly, a self-tensioning tie down strap is provided. The self-tensioning tie down strap including first and second attachment clips, a buckle assembly, and a self-tensioning strap assembly wherein the buckle assembly is connected to the self-tensioning strap assembly; the buckle assembly and the self-tensioning strap assembly are connected between the first and second attachment clips; and the self-tensioning strap assembly includes a spring loaded take up spool mechanism, a length of take up spool strapping material, a variable length strap section, and a fixed length strap section; the length of take up reel strapping material being wound onto the take up spool of the take up spool mechanism; a free end of the take up reel strapping material being attached to a first end of the variable length strap section; the second end of the variable length strap section being secured to a frame portion of the take up spool mechanism; a third end of the fixed length strap section being secured to the frame portion of the take up spool mechanism; and the take up reel strapping material having a first thickness less than a second thickness of the variable length strap section.

In a preferred embodiment the first and second attachment clips are coated with a resilient plastic. In another preferred embodiment, the buckle is a quick release seat belt type buckle. The term "quick release buckle assembly" is used herein to mean a buckle assembly that can be disconnected by a user using one hand and a single movement such as a vehicle seat belt buckle.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a perspective view of an exemplary embodiment of the self-tensioning tie down strap of the present invention showing the first and second vinyl covered attachment clips, the conventional quick release buckle assembly, and the self-tensioning strap assembly including the spring loaded take up spool mechanism connected between the retractable strap section and the fixed length strap section.

FIG. 2 is a detail perspective view of the self-tensioning strap assembly of FIG. 1 in isolation showing the removable spool cover secured in place with securing screws.

FIG. 3 is a detail perspective view of the self-tensioning strap assembly of FIG. 1 in isolation with the removable spool cover removed to reveal the take up reel strapping material fully retracted onto the spring loaded take up reel and the end of the take up reel strapping material stitched to the end of the variable length strap section.

FIG. 4 is a detail perspective view of the self-tensioning strap assembly of FIG. 3 showing the take up reel strapping material partially unwound from the spring loaded take up reel.

DESCRIPTION OF THE EXEMPLARY EMBODIMENT

Figure 5:
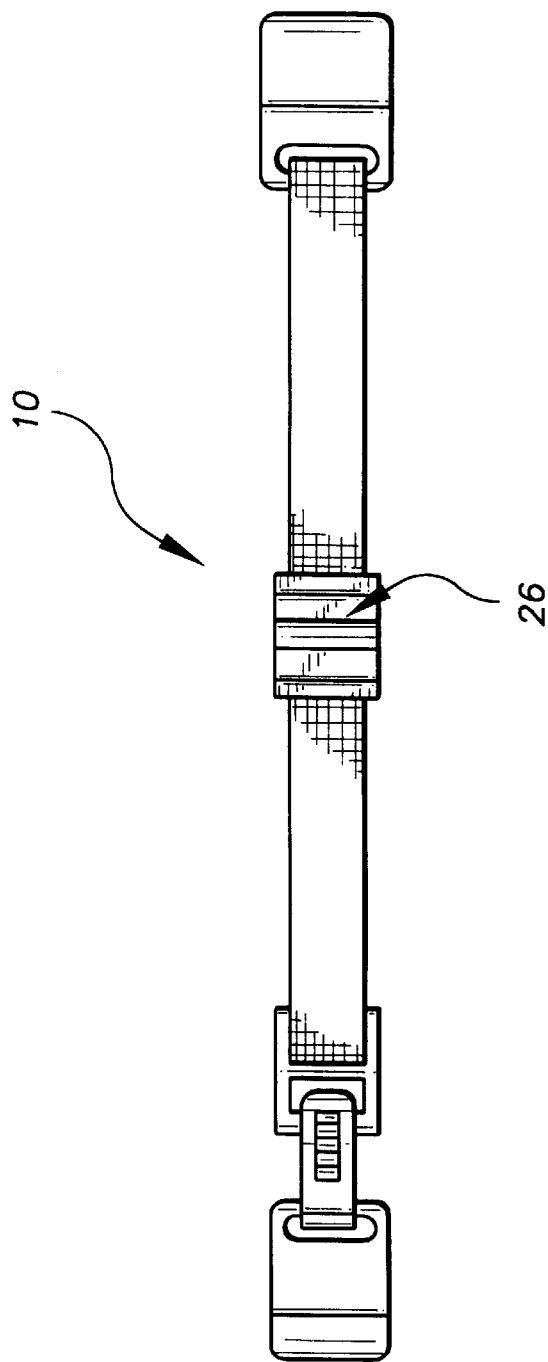
FIG. 5 is a top plan view of the exemplary self-tensioning tie down strap of FIG. 1 with the take up reel strapping material fully wound onto the spring loaded take up reel.

FIG. 1 shows an exemplary embodiment of the self-tensioning tie down strap of the present invention generally designated by the numeral 10. Self-tensioning tie down strap 10 includes first and second vinyl covered attachment clips, generally designated 12,14; a conventional quick release buckle assembly, generally designated 16; and a self-tensioning strap assembly, generally designated 18.

In this embodiment, first and second attachment clips 12,14 are of identical size and vinyl coated steel construction. Each attachment clip 12,14 includes a curved hook portion 20 and a connecting opening 22. One end 24 of quick release buckle assembly 16 is secured through connecting opening 24 of first attachment clip 12.

Self-tension strap assembly 18 includes a spring loaded take up spool mechanism, generally designated 26, that is connected between a variable length strap section 28 and a fixed length strap section 30. In this embodiment, variable length strap section 28 and fixed length strap section 30 are each lengths of one-quarter inch thick nylon webbing. An end 32 of fixed length strap section 30 is secured to second attachment clip 14 through connecting opening 22. With reference now to FIG. 2, another end 36 of fixed length strap section 30 is secured to a frame portion 38 (FIG. 3) of take up spool mechanism 26.

Self-tensioning strap assembly 26 includes a removable molded plastic spool cover 40 that is secured in place on each side thereof with three securing screws 42. With reference now to FIG. 3, self-tensioning strap assembly 26 also includes a length of take up reel strapping material 44 that is wound onto a conventional spring loaded take up reel 46 that is mounted at the center of metal frame portion 38 of take up spool mechanism 26. The free end 48 of take up reel strapping material 44 is stitched to a first end 50 of variable length strap section 28. A second end 52 is secured to metal frame portion 38 in the same manner as end 36 of fixed length strap section 30. In this embodiment take up reel strapping material is a nylon webbing material having a thickness of about one-eighth inch. Use of a nylon webbing material having a thickness of about one half the thickness of variable length strap section 28 and fixed length strap section 30 allows a lower profile self-tensioning strap assembly 26 to be used.

Figure 6:
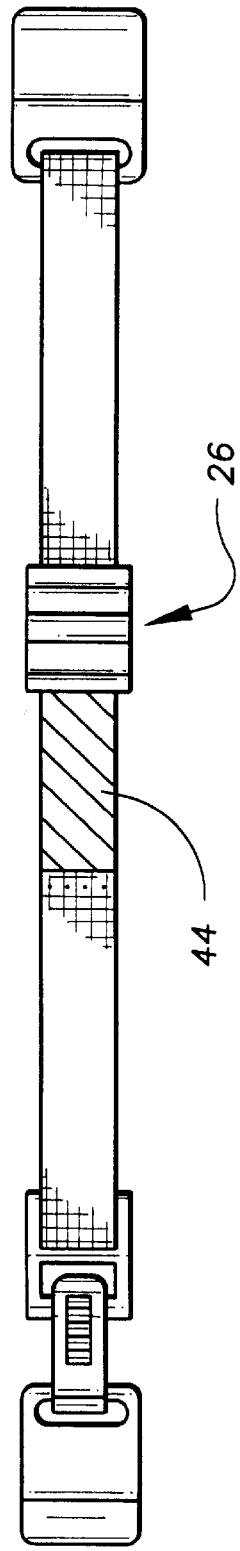
FIG. 6 is a top plan view of the exemplary self-tensioning tie down strap of FIG. 1 with the take up reel strapping material partially unwound from the spring loaded take up reel and extending out past the removable spool cover.

FIG. 4 shows free end 48 take up reel strapping material 44 partially unwound from spring loaded take up reel 46. FIG. 5 shows self-tensioning tie down strap 10 with take up reel strapping material 44 (FIGS. 3 and 4) fully retracted into spring loaded take up spool mechanism 26. FIG. 6 shows self-tensioning tie down strap 10 with take up reel strapping material 44 fully retracted into spring loaded take up spool mechanism 26.

It can be seen from the preceding description that a self-tensioning tie down strap has been provided that includes a tensioning mechanism between first and second attachment clips that automatically provides a predetermined tension between the first and second attachment clips; that includes a two-part tie down strap with a tensioning mechanism wherein the two-part tie down strap is interconnected by an easily disconnected buckle; and that includes first and second attachment clips, a buckle assembly, and a self-tensioning strap assembly wherein the buckle assembly is connected to the self-tensioning strap assembly; the buckle assembly and the self-tensioning strap assembly are connected between the first and second attachment clips; and the self-tensioning strap assembly includes a spring loaded take up spool mechanism, a length of take up spool strapping material, a variable length strap section, and a fixed length strap section; the length of take up reel strapping material being wound onto the take up spool of the take up spool mechanism; a free end of the take up reel strapping material being attached to a first end of the variable length strap section; the second end of the variable length strap section being secured to a frame portion of the take up spool mechanism; a third end of the fixed length strap section being secured to the frame portion of the take up spool mechanism; and the take up reel strapping material having a first thickness less than a second thickness of the variable length strap section.

It is noted that the embodiment of the self-tensioning tie down strap described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A self-tensioning tie down strap comprising:

first and second attachment clips;

a buckle assembly; and a self-tensioning strap assembly;

said buckle assembly being connected to said self-tensioning strap assembly;

said buckle assembly and said self-tensioning strap assembly being connected between said first and second attachment clips; and said self-tensioning strap assembly including a spring loaded take up spool mechanism, a length of take up spool strapping material, a variable length strap section, and a fixed length strap section; said length of take up reel strapping material being wound onto said take up spool of said take up spool mechanism; a free end of said take up reel strapping material being attached to a first end of said variable length strap section; a second end of said variable length strap section being secured to a frame portion of said take up spool mechanism; a third end of said fixed length strap section being secured to said frame portion of said take up spool mechanism; and said take up reel strapping material having a first thickness less than a second thickness of said variable length strap section.

2. The self-tensioning tie down strap of claim 1, wherein:

said first and second attachment clips have a resilient plastic coating.

3. The self-tensioning tie down strap of claim 1, wherein:

said buckle assembly is a quick release buckle assembly.

4. The self-tensioning tie down strap of claim 3 wherein:

said buckle assembly is a quick release buckle assembly.

\* \* \* \* \*